US011059372B2

(12) United States Patent
Hodgson et al.

(10) Patent No.: US 11,059,372 B2
(45) Date of Patent: Jul. 13, 2021

(54) TRACTION CONTROL METHOD AND APPARATUS (71) Applicant: Sevcon Limited, Gateshead (GB)

(72) Inventors: David Hodgson, Gateshead (GB); Howard Slater, Gateshead (GB)

(73) Assignee: Sevcon Limited, Gateshead (GB)

(*) Notice: Subject to any disclaimer, the term of this patent is extended or adjusted under 35 U.S.C. 154(b) by 563 days.

(21) Appl. No.: 15/577,074

(22) PCT Filed: May 20, 2016

(86) PCT No.: PCT/GB2016/051465
§ 371 (c)(1),
(2) Date: Nov. 27, 2017

(87) PCT Pub. No.: WO2016/193668
PCT Pub. Date: Dec. 8, 2016

(65) Prior Publication Data
US 2018/0086208 A1 Mar. 29, 2018

(30) Foreign Application Priority Data
May 29, 2015 (GB) ...................................... 1509336

(51) Int. Cl.
*B60L 3/10* (2006.01)
*B60L 7/18* (2006.01)
(Continued)

(52) U.S. Cl.
CPC ................ *B60L 3/108* (2013.01); *B60L 3/08* (2013.01); *B60L 3/104* (2013.01); *B60L 7/18* (2013.01);
(Continued)

(58) Field of Classification Search
CPC .. B60L 3/108; B60L 15/2018; B60L 15/2081; B60L 3/08; B60L 3/104; B60L 7/18; B60L 15/2009
(Continued)

(56) References Cited

U.S. PATENT DOCUMENTS 4,402,047 A * 8/1983 Newton ................ B60T 8/1766
303/191
5,774,820 A * 6/1998 Linden ................. B60K 31/047
180/179
(Continued)

FOREIGN PATENT DOCUMENTS

CN 101189141 A 5/2008
CN 104129305 A 11/2014
(Continued)

OTHER PUBLICATIONS

Vehicle Mass Estimation Based on High-Frequencey-Information Extraction, 7th IFAC Symp. on Advances in Auto. Control, Sep. 4-7, 2013, Tokyo, Japan.

*Primary Examiner* — Isaac G Smith
(74) *Attorney, Agent, or Firm* — Woodard Emhardt Henry Reeves & Wagner LLP (57) ABSTRACT An electric motor controller adapted to provide anti-lock braking of an electric traction motor for an electric vehicle is disclosed herein. The electric motor controller comprises a torque demand input for receiving a torque demand input signal based on a request from an operator of the electric vehicle and a torque demand adjuster adapted to adjust the torque demand input signal and to provide an adjusted torque demand signal. The torque demand adjuster is configured to adjust the torque demand signal such that the motor is controlled to reduce the difference between a motor speed and an estimated speed of the electric vehicle.

17 Claims, 3 Drawing Sheets (51) Int. Cl.
*B60L 3/08* (2006.01)
*B60L 15/20* (2006.01)

(52) U.S. Cl.
CPC ....... *B60L 15/2009* (2013.01); *B60L 2240/12* (2013.01); *B60L 2240/16* (2013.01); *B60L 2240/26* (2013.01); *B60L 2240/421* (2013.01); *B60L 2240/423* (2013.01); *B60L 2240/465* (2013.01); *B60L 2240/642* (2013.01); *B60L 2250/26* (2013.01); *B60Y 2200/91* (2013.01); *Y02T 10/64* (2013.01); *Y02T 10/72* (2013.01); *Y02T 90/16* (2013.01)

(58) Field of Classification Search
USPC ...................................................... 701/22, 71
See application file for complete search history.

(56) References Cited

U.S. PATENT DOCUMENTS

| | | | | |
|---|---|---|---|---|
| 6,535,808 | B1* | 3/2003 | Zumberge | B60K 31/107 |
| | | | | 701/70 |
| 2005/0065695 | A1* | 3/2005 | Grieser | G01G 19/086 |
| | | | | 701/70 |
| 2009/0101428 | A1* | 4/2009 | Itoh | B60T 8/175 |
| | | | | 180/197 |
| 2009/0115246 | A1 | 5/2009 | Yanagida et al. | |
| 2009/0234552 | A1* | 9/2009 | Takeda | B60W 40/09 |
| | | | | 701/96 |
| 2009/0240415 | A1* | 9/2009 | Sukaria | B60W 50/082 |
| | | | | 701/84 |
| 2010/0161164 | A1* | 6/2010 | Ichinose | B60L 15/20 |
| | | | | 701/22 |
| 2012/0197506 | A1* | 8/2012 | Reynolds | B60T 8/17616 |
| | | | | 701/84 |
| 2014/0067155 | A1 | 3/2014 | Yu et al. | |
| 2015/0057866 | A1* | 2/2015 | Tseng | B60W 10/10 |
| | | | | 701/22 |
| 2015/0112528 | A1* | 4/2015 | Lee | B60L 7/10 |
| | | | | 701/22 |
| 2015/0127237 | A1 | 5/2015 | Blyth et al. | |
| 2015/0217688 | A1* | 8/2015 | Schneider | G01S 15/02 |
| | | | | 73/117.03 |
| 2015/0276050 | A1* | 10/2015 | Fodor | F16H 61/0437 |
| | | | | 701/60 |
| 2015/0290995 | A1* | 10/2015 | Kanda | B60G 17/0182 |
| | | | | 701/37 |

FOREIGN PATENT DOCUMENTS

| | | | |
|---|---|---|---|
| EP | 2 070 760 | 6/2009 | |
| EP | 2 700 532 | 2/2014 | |
| JP | S3269064 | 11/1988 | |
| JP | 2007106338 | 4/2007 | |
| JP | 2009006835 | 1/2009 | |
| JP | 2009177967 | 8/2009 | |
| JP | 2010051160 | 3/2010 | |
| JP | 2010249597 A | * 11/2010 | |
| WO | WO PCT/GB2014/051517 | 5/2014 | |
| WO | WO-2014188162 A2 | * 11/2014 | B66F 9/24 |

\* cited by examiner

TRACTION CONTROL METHOD AND APPARATUS

FIELD OF INVENTION

The present invention relates to methods and apparatus for the control of electric traction motors, and more particularly to an electric motor controller that provides traction control, such as anti-lock braking, for an electric vehicle.

BACKGROUND

When a vehicle's wheels spin and slip, or lock and skid, traction is lost and the vehicle's operator may have less control over the vehicle's handling. Such loss of traction can occur during braking or acceleration. It also causes energy losses, and adversely affects vehicle handling because a skidding wheel (e.g. one in which the tyre contact patch is sliding relative to the road) has less grip on the road than a non-skidding wheel. One solution to this problem is an anti-lock braking system, also known as ABS. In ABS systems sensors are mounted on individual vehicle wheels, or in the differential, to monitor the speed of rotation of the wheels and to moderate the braking torque applied to the wheels based on these individual sensor measurements. In such systems a deviation of wheel speed from the average measured wheel speed can be used to determine when to apply braking torque.

In conventional braking systems, excess kinetic energy of a vehicle is dissipated as heat in the brake linings. Electric and hybrid vehicles however may use regenerative braking to improve energy efficiency, for example so that energy stored in the momentum of the vehicle can be harvested during braking to be stored and reused. It would be of particular benefit in electrical vehicles to increase the energy available from regenerative braking so as to reduce battery demands and increase vehicle range. The effectiveness of regenerative braking however may depend on the torque applied to the regenerative system. In order to avoid causing wheel slip, torques applied to regenerative braking systems have generally been kept low. This avoids large torques, which might cause the wheels of a vehicle to slip and lose traction, but it reduces the efficiency benefit which might otherwise be available. Loss of traction when accelerating is a problem in hybrid and electric vehicles for the same reasons as it is in conventional vehicles.

The degree of tyre slip and wheel lock is dependent upon the properties of the road surface and the magnitude of torque applied to the wheel. Sensing road conditions can be complex, and prior art attempts to address this problem have developed sophisticated sensing systems to provide indications of wheel motion and to adapt to different road conditions and different road surfaces.

The present disclosure aims to address related technical problems but to do so without the need for complex sensing arrangements.

SUMMARY OF INVENTION

Aspects and examples of the present invention are set out in the claims. Aspects of the disclosure provide methods and apparatus for traction control in electric vehicles. One example of traction control is anti-lock braking. Another example of traction control is reducing wheel-slip during acceleration. Such methods and apparatus may operate without the need to sense individual wheel speeds.

For example, aspects of the disclosure comprise electric motor controllers and regenerative braking systems. According to the present disclosure such apparatus is configured to use torque demands made of a motor, signals from a two-axis accelerometer, and measured motor speed to estimate the vehicle speed. The difference between this estimated vehicle speed and the motor speed can then be used to identify and control loss of traction. For example the torque demand made of the motor can be adjusted so as to reduce the difference between the motor speed and the estimated vehicle speed.

The apparatus may also be configured to estimate vehicle speed in a closed loop mode in which the motor speed is taken into account to estimate the vehicle speed and to switch from this closed loop mode to an open loop mode in response to detecting a loss of traction. In the open loop mode the weighting applied to the motor speed in estimation of the vehicle speed may be reduced. The apparatus may also be configured so that the vehicle speed estimate switches back from the open loop mode to the closed loop mode in response to determining that the motor speed matches the (open loop) estimated vehicle speed.

To estimate the vehicle speed aspects of the disclosure may estimate the vehicle mass using a vehicle motion model. Aspects of the disclosure may also estimate the gradient on which the vehicle is being driven.

The rate of motor torque adjustment may be controlled to permit the torque demand to be cutback (reduced) more rapidly than it can be restored to the level requested by an operator of the vehicle.

The accelerometer may be integrated with electric motor controllers disclosed herein. In some examples they may be mounted in a common housing with the timing control circuitry that drives a power converter to power the motor. For example they may be carried on the same PCB as the timing control circuitry. Such systems may permit a single unit, such as an inverter and/or the controller of that inverter, to be replaced and/or upgraded to provide traction control in an existing vehicle without the need to install complex sensor systems and wheel monitoring apparatus.

BRIEF DESCRIPTION OF DRAWINGS

Aspects of the disclosure will now be described in detail, by way of example only, with reference to the accompanying drawings, in which.

SPECIFIC DESCRIPTION

Figure 1:
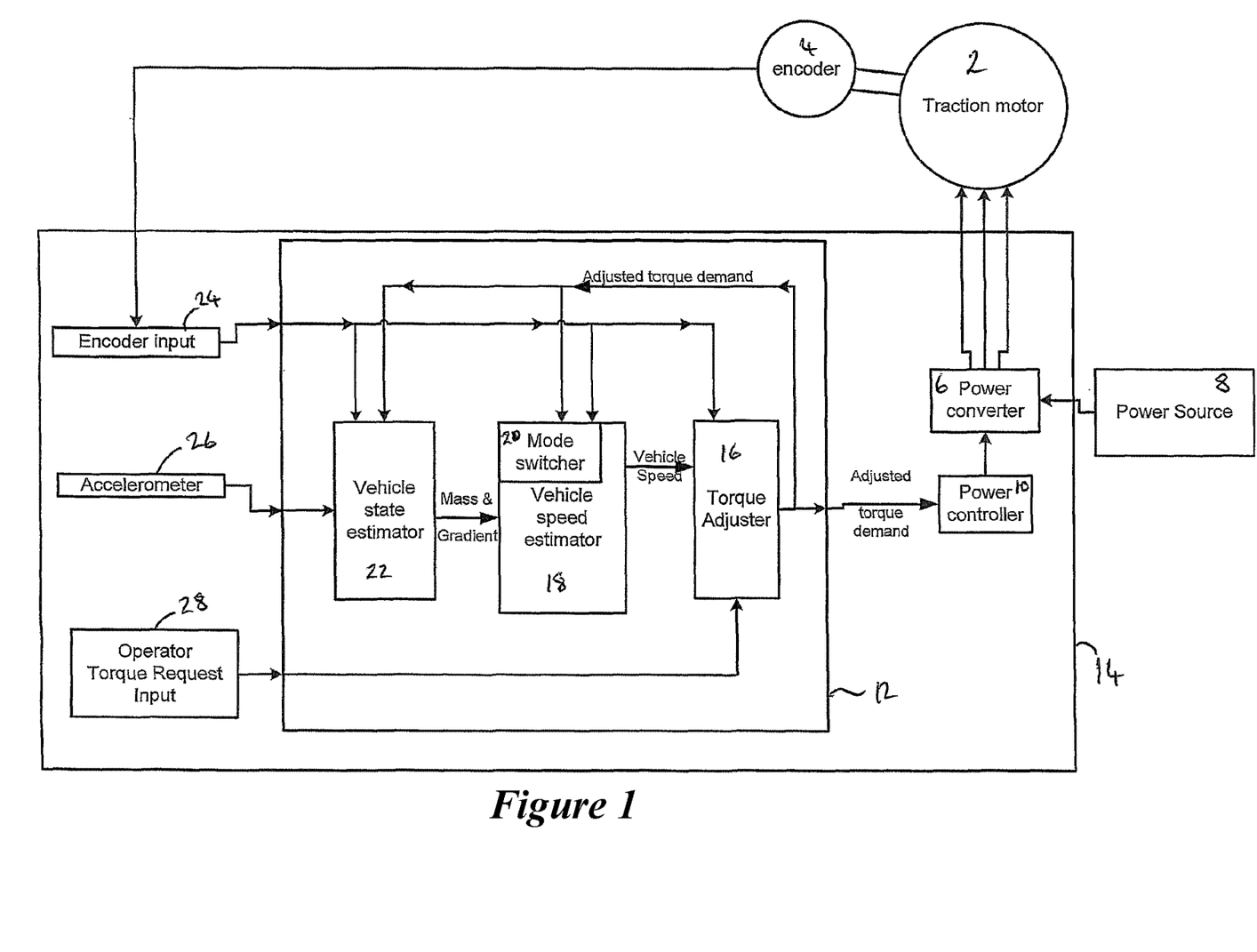
FIG. 1 shows a diagram of a motor controller.

FIG. 1 shows a functional block diagram of an electric vehicle comprising an electric traction motor and an electric motor controller 14 a power source 8, and an encoder 4. The electric motor controller 14 illustrated in FIG. 1 is configured to provide traction control for the electric vehicle by adjusting the torque demand made of the traction motor 2 so as to reduce any difference between the motor speed and an estimate of the vehicle speed obtained using an accelerometer carried by the electric motor controller 14. The estimate of vehicle speed is based on an estimate of the vehicle's mass and any gradient on which it sits. This enables the speed estimate to be obtained without the use of wheel sensors.

The electric motor controller 14 of FIG. 1 comprises a torque demand input for receiving a torque request from an operator of the electric vehicle and is configured to adjust the actual torque demand made of the electric traction motor 2 so that the vehicle responds to the operator's requests whilst also reducing any difference between the vehicle's speed and the speed of the electric motor.

The electric motor controller 14 is coupled to convert DC power from the power source 8 into AC power for driving the electric traction motor 2. The encoder 4 is coupled to the electric traction motor 2 for sensing the motor speed and for providing a motor speed signal to the electric motor controller 14.

The electric motor controller 14 comprises an encoder input 24 for receiving this motor speed signal, a torque request input 28 for receiving a user's torque demands (e.g. from an accelerator pedal), and an accelerometer. The accelerometer is arranged to provide a signal indicating acceleration along at least two axes, for example a horizontal axis aligned with the direction of travel of the vehicle and a vertical axis perpendicular to the wheel base of the vehicle.

The electric motor controller 14 comprises a power controller 10 for controlling the delivery of AC power to the electric traction motor 2 from a power converter 6 such as an inverter. The electric motor controller 14 also comprises a processor 12 arranged to provide an adjusted torque demand signal to the power controller 10. The adjusted torque demand signal is determined by the processor 12 based on the motor speed, the operator's torque request, and the accelerometer output. In the example illustrated in FIG. 1 the processor 12 comprises a vehicle state estimator, a vehicle speed estimator, a mode switcher 20, and a torque adjuster 16.

The vehicle state estimator 22 is coupled to the motor speed signal, the accelerometer signal, and the adjusted torque demand signal. The vehicle state estimator 22 is coupled to provide vehicle parameters, such as an estimate of the vehicle mass and the gradient of the surface on which the vehicle is being driven (e.g. the angle of the vehicle with respect to gravity), to the vehicle speed estimator.

The vehicle speed estimator 18 is further coupled to the motor speed signal and to the accelerometer signal. The vehicle speed estimator 18 also comprises a mode switcher 20 and is coupled to the adjusted torque demand signal—e.g. the actual torque demand made of the motor after the application of any adjustment.

The torque adjuster 16 is arranged to obtain an estimate of the vehicle mass from the vehicle state estimator 22 and an estimate of the vehicle speed from the vehicle speed estimator 18. The torque adjuster 16 is also coupled to the operator torque request input 28 to obtain the operator's torque request, and to the encoder input 24 to obtain the motor speed signal. The torque adjuster 16 is arranged to provide an adjusted torque demand signal to the power controller 10, and is also arranged to feed the adjusted torque demand signal back to the vehicle state estimator 22 and the vehicle speed estimator 18.

The vehicle state estimator 22 is configured to fit a model of the vehicle motion to the motor speed signal and the accelerometer signal in order to obtain an estimate of vehicle parameters such as the vehicle's mass. The actual (adjusted) torque demand made of the motor is also used as an input to this model. The model may comprise a least squares estimator and may take the form of a general linear or non-linear model derived from: $a_{xz}=F(m, g, T)$, where $a_{xz}$ is the acceleration of the vehicle measured by the accelerometer 26, m is the mass of the vehicle, g is the gradient, T is the torque demand applied to the motor, and F is a known numerical or analytical function describing the vehicle dynamics. This function may be derived empirically and stored in memory (e.g. to provide a look-up-table type estimator) or it may be based on analytical/kinematic modelling of the vehicle. The output from the vehicle state estimator 22 comprises (1) an estimate of the vehicle's mass, m, and (2) an estimate of the gradient, g, upon which the vehicle is being driven. These parameters are provided to the vehicle speed estimator 18. The vehicle state estimator 22 may be configured to maintain a constant estimate of the vehicle mass during general operation, and to only update the estimate of the vehicle mass when the vehicle moves off from rest, or the speed drops below a selected threshold value.

The vehicle speed estimator 18 is configured to estimate the vehicle speed based on the vehicle mass and gradient (vehicle tilt angle) estimates, the actual (adjusted) torque demands made of the motor, and the motor speed. The speed estimator 18 is configured to operate recursively—that is to say it also makes use of its own prior estimates of vehicle speed in addition to these input parameters to update its estimate of vehicle speed.

A variety of different estimation algorithms may be used for this purpose—one example of a recursive estimator is a Kalman Filter, but other estimation algorithms may also be used. In such systems, the vehicle speed estimator 18 is configured to operate in discrete time steps, and at any given time step to estimate the current (or predicted) vehicle speed based on these input parameters, and one or more of its own previous estimates of the vehicle speed. In addition, error signals describing the accuracy of one, some or all of the input parameters and/or the accuracy of the prior estimate(s) of speed may also be used by the vehicle speed estimator 18 to estimate the vehicle speed. The vehicle speed estimator 18 is also configured to determine the accuracy (e.g. an error) of each estimate of the vehicle speed, e.g. based on the accuracy of the inputs to the estimation model. The vehicle speed estimator 18 may be configured to give a weighting to the input parameters, and to the prior speed estimates, which determines the relative contribution of each of those terms in estimating the current vehicle speed. That weighting may be determined based on the actual or estimated error in each of the relevant terms. The actual or estimated error may be selected (e.g. predetermined or hardcoded) or may be determined based on statistical error measures such as variance.

The mode switcher 20 is configured to monitor the estimated vehicle speed and the measured motor speed signal from the encoder 4, and to change the mode of operation of the vehicle speed estimator 18 in response to detecting that the estimated vehicle speed differs from the motor speed by more than a selected amount. To switch from the closed loop to the open loop mode, the vehicle speed estimator may be configured to reduce the weighting applied to the motor speed as an input to the vehicle speed estimation. For example, the vehicle speed estimator may be configured to disregard the motor speed measurement. In addition, the vehicle speed estimator may be configured to increase the weighting applied to the accelerometer signal in estimation of the vehicle speed. The mode of the vehicle speed estimator 18 may be switched to open loop estimation in response to the magnitude of the difference between the motor speed and the estimated speed of the electric vehicle exceeding a predetermined threshold—e.g. when the difference between the motor speed and estimated vehicle speed indicates wheel slip or lock. In addition, the mode of the vehicle speed estimator 18 may be switched from the open loop estimation mode back to the closed loop mode in response to the motor speed matching the estimated speed (e.g. the magnitude of the difference being less than the predetermined threshold. In some cases, the vehicle speed estimator may be switched back to closed loop mode in the event that the magnitude of the torque adjustment is less than a selected threshold level, for example when the magnitude is 0.

The vehicle speed estimator 18 is configured so that, when operating in the closed loop mode the motor speed (e.g. measured by the encoder 4) is used by the vehicle speed estimator 18 to estimate the vehicle speed. In the open loop mode the motor speed signal obtained from the encoder 4 is given less weight than in the closed loop mode, for example it may be disregarded altogether in estimating the vehicle speed. For example, in the open loop model, the vehicle speed estimate may be based on one or more estimates of vehicle speed obtained prior to entering the open loop mode and/or the degree of weighting given to prior estimates of vehicle speed may be increased as compared to the relative weight given to those prior estimates of vehicle speed when operating in closed loop mode.

The torque adjuster 16 is configured to compare the estimated vehicle speed signal with the motor speed signal obtained from the encoder 4 and, in the event that the motor speed signal matches the estimated vehicle speed, the operator's torque demand is not adjusted. If however this comparison detects a mismatch the torque adjuster 16 is configured to respond by adjusting the torque demand, e.g. by backing-off (reducing) or increasing the torque demand so as to reduce or eliminate this mismatch.

The torque adjuster 16 may be configured so that such adjustment is only applied in response to the mismatch exceeding a selected tolerance level for a selected time period. For example, a time period selected based on transient windup or backlash associated with the vehicle's drivetrain. The torque adjuster 16 may also be configured to trigger operation of the mode switcher 20 in response to detecting this above-threshold mismatch so that whenever the torque adjuster 16 is adjusting the torque demand, the vehicle speed estimator 18 always operates in open loop mode.

The torque adjuster 16 is configured to select the torque adjustment based on the sign of this mismatch. For example if the mismatch indicates an overshoot in motor speed (associated with wheel slip during acceleration) the torque demand is backed-off (reduced) to reduce the acceleration of the motor. On the other hand, if the mismatch indicates an undershoot in motor speed, associated with wheel lock during braking, the deceleration of the motor (braking torque) can be reduced by increasing the torque demand (and so the motor speed) until motor speed and vehicle speed match.

The "mismatch" between the motor speed and vehicle speed provides a difference, or error, signal that is used to determine the degree of torque adjustment that is to be applied by the torque adjuster 16. To improve vehicle handling the torque adjuster 16 is configured to modify this difference signal. For example, the torque adjuster 16 may comprise a low pass filter arranged to filter the difference between the motor speed and the estimated vehicle speed. The low pass filter may have a cut off frequency selected based on the time constant (or characteristic frequency) of the vehicle's drive train so as to reduce or eliminate transients associated with drive train wind-up and backlash. The torque adjuster 16 may also be configured to taper down the torque adjustment over time—for example the torque adjuster 16 can apply an initial torque demand adjustment in response to the mismatch in motor speed and vehicle speed being detected, and then to gradually reduce the magnitude of the torque demand adjustment. This may enable the torque adjuster 16 to converge on the minimum level of torque adjustment that will correct the mismatch between the vehicle speed and motor speed. This may be achieved by applying a reduction (negative offset) to the difference signal before processing it with a PI controller (or its functional equivalent). The torque adjustment can then be determined based on the tapered (reducing over time) torque adjustment signal.

The torque adjuster 16 may also be configured to allow a reduction in the maximum available torque demand to be applied more quickly than the adjusted maximum available torque demand is allowed to recover to its default level. For example, the torque adjuster 16 may be configured to limit the rate at which the torque demand is restored to the level requested by the operator, but to allow the rate of cut-back to be determined only by the mismatch between motor speed and vehicle speed. This may enable the torque demand made of the motor to be reduced more quickly than it can revert to the value of the torque demand input signal, and may inhibit or prevent the applied torque adjustments from giving rise to unwanted vehicle behaviour such as oscillations or juddering.

To assist in understanding the present disclosure the apparatus of FIG. 1 will now be described in operation.

In operation, when a vehicle comprising the apparatus of FIG. 1 is to be started from rest, a user makes a torque demand of the controller in order to move off. The operator's torque request is passed to the torque adjuster 16 which then provides an actual torque demand signal (e.g. a signal which includes any adjustment). The processor 12 of the electric motor controller 14 then controls the power controller 10 and power converter 6 based on this actual torque demand.

The vehicle state estimator 22 obtains a signal from the encoder 4 indicating the motor speed, and a signal from the accelerometer 26 indicating the inertial force sensed by the accelerometer 26 (e.g. the force of gravity in addition to any acceleration due to motion of the vehicle). The accelerometer 26 signal indicates the magnitude of this force in the direction of travel of the vehicle, and in a direction perpendicular to the wheel base. The vehicle state estimator 22 also obtains the actual torque demand signal, and uses this, with the motor speed and accelerometer 26 signal, to obtain an estimate of the vehicle's mass and any gradient on which it may be standing using the model of the vehicle motion described above.

The vehicle speed estimator 18 then updates its estimate of vehicle speed based on the motor speed signal, the actual torque demand, and the mass and gradient estimate signals obtained from the vehicle state estimator 22. In the event that the motor speed differs from the estimated vehicle speed by more than the selected threshold level, the mode switcher 20 changes the speed estimator 18 into the open loop mode and provides an estimate of the vehicle speed to the torque adjuster 16. The torque adjuster 16 then calculates an adjustment of the torque demand selected to reduce the difference between the motor speed and the estimate of the vehicle speed. For example, if the difference between the two indicates that the motor is accelerating more quickly than the vehicle, the torque adjuster 16 backs off (reduces) the torque demand by an amount selected to reduce that difference. The calculated torque adjustment may be applied by reducing the maximum limit on the braking or driving torque. For example, when the torque request is in the same direction as the vehicle's motion (driving torque) the torque adjustment is applied to reduce the maximum available torque, rather than directly modifying the operator's torque request. The braking torque, and driving torque limit may be encoded separately, and adjusted separately. In both cases however the torque adjustment is applied by reducing the maximum available torque—the torque limit. This may enable improved operator control.

While the torque demand adjustment is being applied, the vehicle speed estimator 18 operates in the open loop mode. In other words, during periods when the operation of the motor is being adjusted to reduce wheel slip or wheel lock, the estimate of vehicle speed reduces the weighting given to the motor speed. For example the motor speed may be disregarded. In addition the weighting given to prior estimates of the vehicle speed may be increased in estimation of the current vehicle speed.

While the adjustment is being applied, at each time step, the torque adjuster 16 determines updated measures of the difference between the current (open loop) estimated vehicle speed and the motor speed to obtain an updated difference signal. The level of torque adjustment that is to be applied is then determined based on the updated difference signal. As mentioned above, the torque adjuster 16 is configured to always try to reduce the level of torque adjustment that is applied, so for example if the difference signal were to remain constant, the torque adjuster 16 would gradually reduce the level of torque adjustment. This may be achieved by the torque adjuster 16 modifying the difference signal using a negative offset, and calculating the level of torque adjustment (cutback) based on the output of a PI controller operating on this modified difference signal. The calculated torque adjustment is then applied to the operator's torque request to provide a new actual torque demand signal to the power controller 10.

Figure 2A:
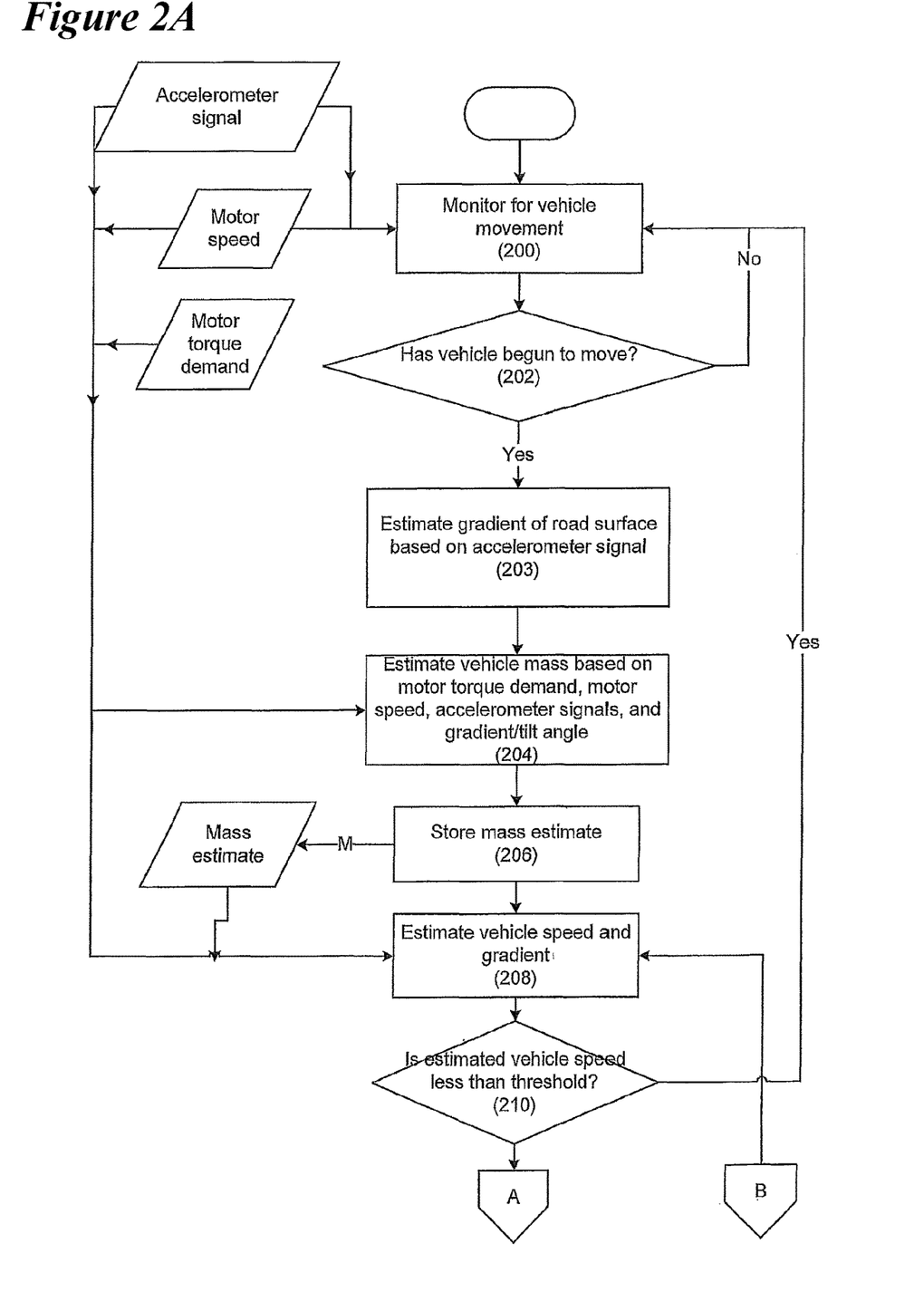
FIG. 2 shows a flow chart illustrating a method useful in traction control.
Figure 2B:
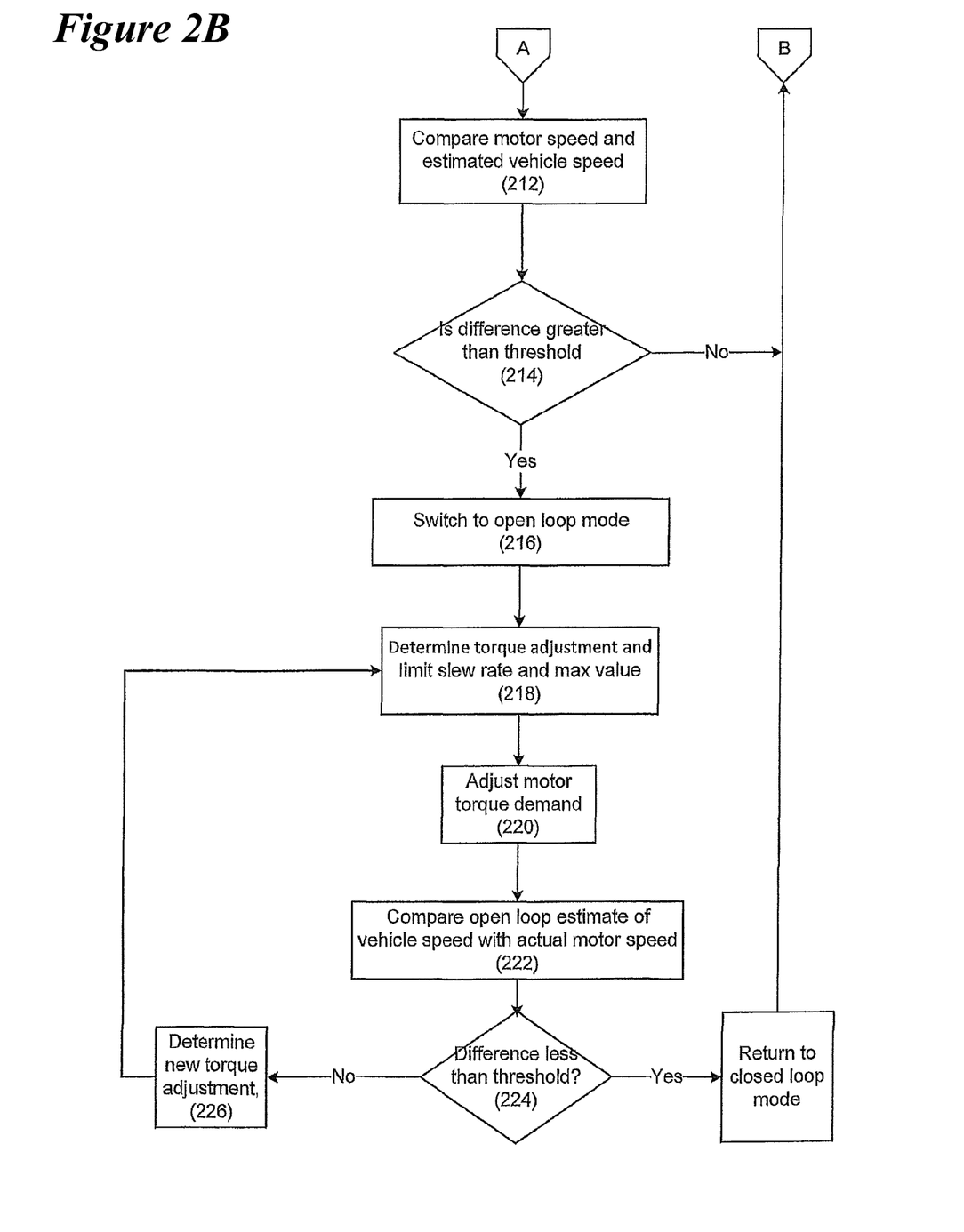

FIG. 2 is a flow chart illustrating a method of operation which may be implemented in a suitably programmed electric motor controller 14 adapted to receive accelerometer signals (e.g. from a two axis accelerometer) and motor speed signals (e.g. from an encoder 4).

Taking the example of a stationary vehicle, the method illustrated in FIG. 2 proceeds as follows. When the vehicle is switched on, but before it has begun to move, an accelerometer signal is obtained 200 from a multi-axis accelerometer. The motor speed signal may also be obtained, and used to detect 200 vehicle motion. In the event that it is detected that the vehicle is moving off from rest, 202, (e.g. based on an increase in motor speed, or an accelerometer signal) an estimate 203 is made of the tilt angle of the vehicle (e.g. the gradient of the road surface on which it sits). This may be based on the accelerometer signal obtained when the vehicle was at rest, prior to detecting 202 that the vehicle had moved off. For example, an initial estimate of the gradient/tilt angle may be based on accelerometer signals obtained when the vehicle is switched on but before it has begun to drive, and so is not accelerating.

An estimate of the vehicle's mass is then determined 204 based on the gradient, the motor's speed, the motor torque demand, and signals obtained from the accelerometer as the vehicle moves off (e.g. after motion is detected). For example, a model of the vehicle dynamics which relates the vehicle's acceleration, and the gradient, to motor torque and speed may be used to estimate the vehicle's mass. The estimate of vehicle mass is obtained by fitting this model to the accelerometer signal, the motor torque demand, and the motor speed. The model may comprise an a priori estimate of the tilt angle/gradient (e.g. obtained immediately prior to moving off as described above), and the fitting procedure may be performed in a least squares sense. Once the vehicle has moved off from rest, and the vehicle's mass has been estimated, this estimate of mass may be stored 206 into a data store such as a computer readable memory.

Although the estimate of mass may remain constant once the vehicle is in motion, the estimate of gradient is updated as the vehicle is driven, for example based on fitting the motor torque demand, vehicle mass, and motor speed to this same model to obtain a new, updated, estimate of the tilt angle/gradient. In addition, as the vehicle is driven, the vehicle speed is also estimated 208, and re-estimated, as part of a quasi-continuous discrete time process 208, 201 212, 214, 216, 218, 220, 222, 224, 226, 228. The other parts of this process, not directly related to the estimate of speed will be described below. The estimate of vehicle speed is recursive in the sense that it is based on a prior estimate of vehicle speed. It is also based on parameters such as the motor speed, the vehicle's mass, the gradient on which it is being driven, and the torque demand made of the motor. For example, at any given time step, the vehicle speed is estimated based on a model of vehicle dynamics which includes these parameters, and one or more prior estimates of vehicle speed (e.g. from one or more preceding time steps). The errors in these estimates and these parameters (e.g. estimates of their variance or accuracy) are also used in this estimate of vehicle speed. In this embodiment, the estimate is made using a recursive estimator such as a Kalman filter. In performing this recursive estimation, the weighting given to each of these parameters, and each of these estimates, may be based on the error (e.g. the variance) in each.

In this discrete time process, at each time step, the estimated vehicle speed is compared 212 with the motor speed to obtain a difference signal. In this comparison the vehicle speed may be expressed in units of motor speed—e.g. the vehicle speed is scaled to take account of the gear ratio of the drive train and/or the wheel size of the vehicle and it is assumed that there is no wheel slippage, and the drive train is in a steady state. The sign (direction) of the motor torque demand signal is compared with the sign (direction) of the estimated vehicle speed. If the torque demand and speed are of different sign (in opposite directions), then the sign of the difference signal is reversed.

The difference signal is then used to determine 214 whether to apply a torque demand adjustment. For example, if the difference indicates that the motor speed is different from the estimated vehicle speed by more than a threshold tolerance, a torque demand adjustment is determined 216 from the difference signal, and the vehicle speed estimation process 208 is changed into an open loop mode. While operating in open loop mode, the motor speed is given less weight than in the closed loop mode (for example they may be disregarded) when determining the estimated vehicle speed. If it is determined that a torque adjustment is to be applied, the difference signal is attenuated (e.g. by subtracting a small constant offset), before being operated on by a PI controller to determine a torque adjustment (cutback) value. The effect of the attenuation is to cause the PI controller always to try to reduce the size of the torque adjustment, so that in the case of a constant difference signal the level of torque adjustment would be gradually reduced—in other words the torque cutback is selected so as to always allow the operator's torque demand request to be followed—e.g. to maximise the torque available to the vehicle's operator. When determining 216 the torque adjustment, the adjustment value is limited so that it cannot exceed the maximum motor torque. In addition, the torque adjustment is controlled 218 so that the level of torque can be reduced (cutback) more quickly than it can be restored. This may be provided by placing a one-way limit on the slew rate of the torque adjustment.

The calculated torque adjustment is then applied 220 to a torque request received from an operator of the vehicle to provide an adjusted torque demand signal, and the adjusted torque demand signal is provided to a power converter 6 for controlling the delivery of electric power to the traction motor 2. The calculated torque adjustment may be applied 220 by reducing the maximum limit on the braking or driving torque. For example, when the torque request is in the same direction as the vehicle's motion (driving torque) the torque adjustment is applied to reduce the maximum available torque, rather than directly modifying the operator's torque request. The braking torque, and driving torque limit may be encoded separately, and adjusted separately. In both cases however the torque adjustment is applied by reducing the maximum available torque—the torque limit. This may enable improved operator control.

While the torque adjustment is being applied, the gradient is re-estimated, and the vehicle speed is estimated using an open loop estimation model. In particular, this model comprises a description of the vehicle's motion in terms of previous estimates of vehicle speed, the motor torque demand, the vehicle's mass, and the gradient on which it is being driven. This open loop estimate of vehicle speed is compared 222 with the motor speed to determine the difference between the two (the new, updated, difference signal). As explained above, the sign of the motor torque demand signal is compared with the sign of the open loop estimated vehicle speed. If the torque demand and vehicle speed are of different sign (in opposite directions), then the sign of the difference signal is reversed. This means that when braking, the torque adjustment would respond in the opposite sense to that which it would when accelerating. When braking, if the vehicle speed is greater than the motor speed, the torque adjustment will tend to reduce the braking torque available, thereby to allow the motor speed to increase to reduce wheel lock. Conversely, when torque demand and vehicle speed are in the same direction and the vehicle is accelerating, the torque adjustment will tend to reduce the accelerating torque available to reduce wheel slip.

The difference signal is then tested against a threshold, and if the difference signal is less than a threshold size the torque adjustment is stopped (reduced to zero) and the process returns 228 to the closed loop vehicle speed estimation mode. When operating in this open loop mode and applying the torque adjustment, the threshold for stopping the torque adjustment and returning to the closed loop estimation mode may be different from the threshold for beginning to apply the torque adjustment and switching into the open loop estimation mode. If the new difference signal is less than this threshold, a new torque adjustment is calculated 226 and applied 218.

The disclosure above has referred to the control of torque demand, but in some electric vehicles motor control is based on controlling speed rather than torque—for example a speed control loop may be used. In such configurations the torque adjustment would be applied to the output of the speed control loop rather than to the operator's torque request. Other variations of the foregoing embodiments may also be applied. For example the accelerometer may comprise two or more separate single axis accelerometers arranged to sense acceleration (inertial forces) in different directions. The accelerometer may comprise a single multi-axis accelerometer, such as a tilt accelerometer which is operable to provide an indication of the tilt angle of the apparatus with respect to gravity and also the lateral acceleration of the vehicle in a direction of travel. Gyroscopic and/or MEMs accelerometers may also be used, for example the accelerometer signals described herein may be provided by any inertial measurement apparatus.

The encoder 4 which senses the motor speed may be an electro-mechanical device or optical device arranged to determine the angular position or motion of a shaft or axle of the motor and convert this position to an analog or digital signal.

It will also be appreciated that some types of vehicles such as warehouse materials handling vehicles (e.g. lift trucks) will generally always be driven on flat surfaces. In other use cases however, such as for road vehicles, vehicles may be driven on surfaces having gradients which modify the vehicle model. Therefore in some embodiments the parameters determined by the vehicle state estimator 22 include an estimate of the gradient. Accordingly the model used by the vehicle state estimator 22 may be modified to include a parameter that accounts for gradient, e.g. based on a cosine model of the effect of the incline.

The tolerance level used to determine whether the motor speed matches the vehicle speed may be selected based on the performance demands of the vehicle and/or a user preference. The tolerance level may be selected based on the vehicle's speed. For example the tolerance level may comprise a percentage of the vehicle's speed, for example a 5% limit or 2% limit.

It is explained above that the estimates of vehicle mass and vehicle tilt angle/gradient may be determined by fitting a model of vehicle dynamics to the speed and accelerometer signals. This fit may be performed in a least-squares sense, but other fitting procedures may also be used such as Bayesian estimators and maximum likelihood estimators. The model itself may be linear or non-linear, and may comprise a linearised approximation to a non-linear model. It will also be appreciated that the model itself may be numerical or analytic, and may comprise a mixture of analytic and numerically defined contributions.

In the context of the present disclosure it will be appreciated that in the non-slip steady-state condition (in which the wheels grip the road and any backlash in the drive train has unwound) the motor speed and the vehicle's speed are related by the gear ratio of the drive train and the size of the wheels. The present disclosure is of course applicable regardless of the drive train's gearing or wheel size, and so in the interests of simplicity the vehicle speed considered herein will be expressed in units of motor speed—that is to say having been normalised to account for the drive train gearing and wheel size. It will also be appreciated that motor speed is intended to mean the angular speed of the motor's drive output as it is coupled to the drive train.

The embodiment of FIG. 1 has been explained with reference to the control of an AC motor, but the methods and apparatus of the present disclosure may also be used to control the operation of DC motors. Some or all of the apparatus illustrated in FIG. 1 may be contained in a common housing. For example, the accelerometer and electronics for controlling the power converter 6 may be mounted together in the same housing, and may be mounted on the same PCB.

In the drawings like reference numerals are used to indicate like elements. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware.

It will be appreciated by the skilled addressee in the context of the present disclosure that the methods and apparatus described herein may be implemented in custom built hardware logical processing units such as electronics to generate the timing control signals and other outputs which may be used to control an electric motor. One example of such a system is described above, but it will be appreciated that the division of functionality between different parts of that system is merely exemplary and the functionality of one or more of the parts of the system described in FIG. 1 may be shared with other parts of that system, or integrated into a single element. It will also be appreciated that electric motor controllers may also comprise programmable processors, so the control scheme and apparatus described with reference to FIG. 1, above, may also be implemented in a suitably programmed processor of any electric motor controller 14 adapted to receive two-axis accelerometer signals and/or having a built in accelerometer. One example of suitable programming is computer readable instructions which program such a processor to perform the method described with reference to FIG. 2. Accordingly, in some examples of the disclosure, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

As to the apparatus—the function of one or more of the elements shown in the drawings may be further subdivided, and/or distributed throughout apparatus of the disclosure. In some embodiments the function of one or more elements shown in the drawings may be integrated into a single functional unit. Such functional units (e.g. one or more features of the electric motor controller 14, such as the processor and its components) may be implemented with fixed logic such as assemblies of logic gates or programmable logic such as software and/or computer program instructions executed by a processor. Mixtures of software and hardware may also be used. Any kind of programmable logic can also be used, examples of suitable programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An electric motor controller adapted to provide anti-lock braking of an electric traction motor for an electric vehicle, the electric motor controller comprising:
a torque demand input for receiving a torque demand input signal based on a request from an operator of the electric vehicle;
a torque demand adjuster adapted to adjust the torque demand input signal and to provide an adjusted torque demand signal to a power provider, said adjusted torque demand signal indicating an adjusted torque demand, wherein the power provider is configured to control power provided to the electric traction motor based on the adjusted torque demand signal, and the torque demand adjuster comprises:
a motor speed input for obtaining a motor speed signal from said electric traction motor;
an accelerometer configured to provide an accelerometer signal;
a vehicle state estimator configured to determine a vehicle mass using the motor speed signal, the adjusted torque demand signal, and the accelerometer signal as input;
a tilt determiner configured to determine a vehicle tilt angle using the accelerometer signal; and
a vehicle speed estimator configured to determine an estimated speed of the electric vehicle that is determined using the motor speed signal, the adjusted torque demand signal, the vehicle tilt angle and the estimated vehicle mass;
wherein the vehicle speed estimator is operable in a closed loop mode in which the motor speed signal is used to determine the estimate of the vehicle speed, and in an open loop mode in which the weighting applied to the motor speed signal in the estimate of the vehicle speed is reduced, and the controller is configured to switch between the open loop mode and the closed loop mode according to the magnitude of a difference between the motor speed and the estimated speed of the electric vehicle;
wherein the controller is configured to switch the vehicle speed estimator from the open loop mode to the closed loop mode in response to a magnitude of an adjustment to the torque demand being reduced below a selected threshold level; and
wherein the torque demand adjuster is configured to adjust the torque demand signal such that the motor is controlled to reduce a difference between the motor speed and the estimated speed of the electric vehicle.

2. The controller of claim 1 wherein the torque demand adjuster is configured to adjust the torque demand signal by reducing a maximum torque demand that the controller is able to make of the electric motor.

3. The controller of claim 1 wherein the torque demand adjuster is configured to apply an initial torque demand adjustment in response to the difference and then to reduce the magnitude of the torque demand adjustment over time.

4. The controller of claim 1 wherein the torque demand adjuster is configured to limit the rate of change of the adjusted torque demand signal so that the torque demand made of the motor can be reduced more quickly than it can revert to the value of the torque demand input signal.

5. The controller of claim 1 comprising a low pass filter arranged to filter the difference between the motor speed and the estimated speed of the electric vehicle to provide a low pass filtered version of the difference.

6. The controller of claim 1 wherein the vehicle state estimator is configured to update the estimate of vehicle mass in the event that the estimated vehicle speed is less than a selected threshold speed.

7. The controller of claim 1 wherein the vehicle state estimator is configured to determine the estimate of vehicle mass obtained from an accelerometer signal as the vehicle moves off from rest wherein the vehicle state estimator is configured to fit a data model to the motor speed signal, the adjusted torque demand signal, and the accelerometer signal in order to estimate the vehicle mass.

8. The controller of claim 7 wherein the estimate of vehicle mass is further based on an estimate of a gradient on which the vehicle is being driven and an accelerometer signal obtained prior to the vehicle moving off from rest.

9. The controller of claim 1 wherein the vehicle state estimator is configured to estimate a gradient of a surface on which the vehicle is being driven based on using the estimate of vehicle mass when fitting the data model to the motor speed signal, the adjusted torque demand signal, and the accelerometer signal.

10. A method of providing anti-lock braking traction control in an electric vehicle driven by an electric traction motor, the method comprising:
obtaining an accelerometer signal indicating a lateral acceleration of the vehicle in a direction of travel and a tilt angle of the vehicle;
obtaining a motor speed signal indicating a motor speed;
obtaining an estimate of a vehicle mass of the electric vehicle based on the accelerometer signal and a motor speed;
determining an estimate of a vehicle speed;
obtaining a torque demand input signal indicating a torque request from an operator of the electric vehicle; and
adjusting the torque demand input signal to provide an adjusted torque demand signal, and controlling the electric traction motor with the adjusted torque demand signal,
wherein, adjusting the torque demand signal comprises selecting a torque demand adjustment that reduces a difference between the motor speed signal and the estimate of the vehicle speed, and wherein, in a closed loop mode, the estimate of the vehicle speed is determined based on the motor speed signal, the, the vehicle tilt angle and the estimated vehicle mass, and in an open loop mode the weighting applied to the motor speed signal in the estimate of the vehicle speed is reduced; the method further comprising:
switching between the open loop mode and the closed loop mode based on a magnitude of the difference between the motor speed and the estimated speed of the electric vehicle; and
switching from the open loop mode to the closed loop mode in response to a magnitude of an adjustment to the torque demand being reduced below a selected threshold level.

11. The method of claim 10 wherein adjusting the torque demand signal comprises selecting a torque demand adjustment that reduces a maximum torque demand that the electric motor controller is able to make of the electric motor.

12. The method of claim 10 comprising determining whether the vehicle has begun to move from a stationary position and, in the event that the vehicle has begun to move, obtaining the estimate of the mass of the electric vehicle and storing the estimate of the mass in memory.

13. The method of claim 10 comprising determining whether a vehicle mass estimate is stored in memory, and in the event that a vehicle mass estimate is stored in memory, obtaining the estimate of vehicle mass by retrieving it from memory.

14. The method of claim 10 comprising comparing the estimated vehicle speed with the motor speed estimate to obtain an error signal and determining whether or not to adjust the torque demand input signal based on at last least one of the sign and magnitude of the error signal, wherein the method comprises responding to determining to adjust the torque demand by obtaining at least one subsequent estimate of the vehicle speed in an open-loop mode.

15. The method of claim 14 in which the open loop estimate of vehicle speed is used in a subsequent adjustment of the motor torque demand, and the method comprises comparing the at least one subsequent estimate of vehicle speed with the motor speed signal to obtain a new error signal and determining, based on the magnitude of the new error signal, whether to continue to adjust the motor torque demand.

16. The method of claim 10 comprising controlling the adjustment of torque demand so that the motor torque demand can be reduced more quickly than it can be restored.

17. A non transitory tangible computer readable medium comprises program instructions to program a processor of an electric traction motor to perform the method of claim 10.

* * * * *

UNITED STATES PATENT AND TRADEMARK OFFICE
CERTIFICATE OF CORRECTION

PATENT NO. : 11,059,372 B2
APPLICATION NO. : 15/577074
DATED : July 13, 2021
INVENTOR(S) : David Hodgson et al.

Page 1 of 1

It is certified that error appears in the above-identified patent and that said Letters Patent is hereby corrected as shown below:

In the Claims

In Claim 14, Line 4, please delete the word "last".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*